United States Patent
Jung et al.

(10) Patent No.: US 7,952,964 B2
(45) Date of Patent: May 31, 2011

(54) METHOD AND APPARATUS TO DETECT LAND/GROOVE SWITCH POSITION IN SEEK MODE, AND OPTICAL DISK DRIVE USING THE SAME

(75) Inventors: Woo-min Jung, Yongin-si (KR); Nam-taek Hyung, Suwon-si (KR); Sang-hoon Moon, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 332 days.

(21) Appl. No.: 12/127,966

(22) Filed: May 28, 2008

(65) Prior Publication Data

US 2008/0298182 A1    Dec. 4, 2008

(30) Foreign Application Priority Data

May 28, 2007   (KR) ................. 10-2007-0051545

(51) Int. Cl.
   *G11B 7/00* (2006.01)
(52) U.S. Cl. .................................... 369/44.26
(58) Field of Classification Search .................. None
   See application file for complete search history.

(56) References Cited

U.S. PATENT DOCUMENTS

| | | | | |
|---|---|---|---|---|
| 5,859,820 A * | 1/1999 | Nagasawa et al. | ......... | 369/47.35 |
| 5,892,740 A * | 4/1999 | Nagasawa et al. | ......... | 369/44.26 |
| 6,088,307 A * | 7/2000 | Fushimi et al. | ............ | 369/44.13 |
| 6,091,699 A * | 7/2000 | Nakane et al. | ............. | 369/275.3 |
| 6,233,207 B1 | 5/2001 | Tanaka | | |
| 7,411,890 B2 * | 8/2008 | Shin et al. | .................. | 369/275.4 |
| 2005/0117501 A1 * | 6/2005 | Chang et al. | ............ | 369/124.07 |
| 2006/0215511 A1 * | 9/2006 | Shin et al. | .................. | 369/47.51 |
| 2007/0047402 A1 * | 3/2007 | Chen et al. | ................. | 369/44.28 |
| 2008/0089188 A1 * | 4/2008 | Nishiyama et al. | ........ | 369/13.55 |
| 2008/0298182 A1 * | 12/2008 | Jung et al. | .................. | 369/44.17 |

FOREIGN PATENT DOCUMENTS

| | | |
|---|---|---|
| JP | 10-27354 | 1/1998 |
| JP | 10-275338 | 10/1998 |
| KR | 2001-76556 | 8/2001 |

* cited by examiner

*Primary Examiner* — Peter Vincent Agustin
(74) *Attorney, Agent, or Firm* — Stanzione & Kim, LLP

(57) ABSTRACT

A land/groove switch position detecting method includes measuring information about a land/groove switch generation timing of a disc, using a first signal having a frequency that varies in proportion to a rotation speed of the disk in a normal playback mode, and a second signal having a predetermined frequency higher than the frequency of the first signal, and calculating a predicted land/groove switch generation position in the seek mode, using the information about the land/groove switch generation timing.

30 Claims, 3 Drawing Sheets

METHOD AND APPARATUS TO DETECT LAND/GROOVE SWITCH POSITION IN SEEK MODE, AND OPTICAL DISK DRIVE USING THE SAME

CROSS-REFERENCE TO RELATED APPLICATIONS

This application claims priority under 35 U.S.C. §119(a) from Korean Patent Application No. 10-2007-0051545, filed on May 28, 2007, in the Korean Intellectual Property Office, the disclosure of which is incorporated herein in its entirety by reference.

BACKGROUND OF THE INVENTION

1. Field of the Invention

The present general inventive concept relates to a method and apparatus to control an optical disk driver, and more particularly, to a method and apparatus to predict a position at which land/groove switching occurs in a seek mode, and to stably execute a seek servo using the predicted land/groove switch position.

2. Description of the Related Art

Well-known documents related to the present general inventive concept include Korean Patent Laid-open Application No. 2001-76556 and U.S. Pat. No. 6,233,207.

In general, an optical disk has been widely adopted as an information recording medium of an optical pick-up device for recording/reproducing information in a contactless manner. Optical discs are classified into Compact Discs (CDs) and Digital Versatile Discs (DVDs) according to storage capacities thereof. Particularly, DVD-type optical discs that can record and reproduce information include DVD-Random Access Memories (DVD-RAMs) and DVD-rewritables (DVD-RWs).

A great difference between a DVD-RAM and a DVD-RW exists in physical regions on which data is recorded. That is, in a DVD-RAM, information is recorded using all land and groove regions formed in the disc, however, in a DVD-RW, information is recorded on only groove regions formed in the disc.

The DVD-RAM controls a seek speed in a seek mode and executes tracking control in a normal play mode by using a tracking error signal. However, a phase of a tracking error signal in land regions are opposite to a phase of a tracking error signal in groove regions. Accordingly, inverting the phase of a tracking error signal at a land/groove switch position is needed.

In the normal play mode, since a land/groove switch position can be accurately detected using header information recorded in an optical disc, inverting the phase of a tracking error signal using the land/groove switch position is possible.

However, in the seek mode, since head information cannot be accurately read, detecting a land/groove switch position is possible.

Accordingly, when a land/groove switch position is not accurately detected in the seek mode, a seek speed is controlled using a tracking error signal having a wrong phase at any land/groove switch position, which deteriorates performance of controlling the seek speed. Also, when a land/groove switch position is found at a tracking pull-in time, the phase of the tracking error signal becomes opposite to a desired phase to be controlled, so that a track deviation phenomenon occurs and the performance of tracking control deteriorates.

SUMMARY OF THE INVENTION

The present general inventive concept provides a method and apparatus to detect a land/groove switch position in a seek mode by accurately predicting a position at which land/groove switching occurs in the seek mode.

The present general inventive concept also provides an optical disk drive to predict a position at which land/groove switching occurs, in a seek mode, and to execute adaptive servo control using the predicted land/groove switch position.

The present general inventive concept also provides a computer-readable recording medium having embodied thereon a program to execute the method.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a method to detect a land/groove switch position in a seek mode, including measuring information about a land/groove switch generation timing of a disc, using a first signal whose frequency varies in proportion to a rotation speed of the disk in a normal playback mode, and a second signal having a predetermined frequency higher than the frequency of the first signal, and calculating a predicted land/groove switch generation position in the seek mode, using the information about the land/groove switch generation timing.

The first signal may generate a predetermined number of pulses whenever the disk rotates one cycle.

The first signal may be a pulse signal obtained by zero-crossing a back electromotive force signal which is generated by a spindle motor to rotate the disc.

The information about the land/groove switch generation timing may include information regarding number of first signal pulses that are generated from a current land/groove switch time to a previous land/groove switch time, pulse width information of the first signal, and information regarding a time interval from a generation time of a first signal pulse which is generated nearest to the current land/groove switch time to the current land/groove switch time.

The information regarding the time interval from the generation time of the first signal pulse which is generated nearest to the current land/groove switch time to the current land/groove switch time, may be measured using the second signal.

The predicted land/groove switch generation position in the seek mode may be obtained by adding a length corresponding to a ratio of an interval length from a land/groove switch generation position to an edge position of a first signal pulse which is generated nearest to the land/groove switch generation position with respect to a length of a first signal pulse period measured in the normal playback mode to a length of first signal pulses that are included during a land/groove switch period in the normal playback mode from a previous land/groove switch position.

The method may further include inverting a phase of a tracking error signal at the predicted land/groove switch generation position in the seek mode.

The method may further include generating a window signal having a predetermined width to control a seek speed, on a basis of the predicted land/groove switch generation position.

The predetermined width of the window signal may vary according to the frequency of the first signal. The predetermined width of the window signal may vary in inverse-proportion to a frequency of the first signal.

In a period in which the window signal is generated, a seek speed control signal generated just before the window signal is generated may be hold. In a period in which the window signal is generated, no seek speed control signal may be generated.

The seek speed control signal may be a tracking kick control signal to move an optical lens in a pick-up unit.

The foregoing and/or other aspects and utilities of the general inventive concept may also be achieved by providing an apparatus to detect a land/groove switch position in a seek mode, the apparatus including a counting unit counting a number of pulses of a first signal and a number of pulses of a second signal, and to generate information about a land/groove switch generation period according to the count result, a storage unit to store the information about the land/groove switch generation period in a normal playback mode, and a land/groove switch position calculator to obtain a land/groove switch position in a seek mode, using information about the land/groove switch generation period in the normal play mode stored in the storage unit.

The information about the land/groove switch generation period may include a number N of first signal pulses that are generated during a land/groove switch period in the normal playback mode, a number Mp of second signal pulses that are generated during a first signal pulse, the number Mpp of second signal pulses that are generated during a time interval Tpp from a generation time of an edge of a final first signal pulse among the first signal pulses generated during the land/groove switch period, to a land/groove switch time, and a number Sp of second signal pulses that are generated during a first signal pulse period in the seek mode.

The land/groove switch position calculator may determine the land/groove switch position in the seek mode, by adding a length corresponding to a ratio of an interval length from a land/groove switch generation position to an edge position of a first signal pulse which is generated nearest to the land/groove switch generation position with respect to the length of a first signal pulse period measured in the normal play mode to the length of first signal pulses that are included during a land/groove switch period in the normal playback mode from previous land/groove switch position.

The foregoing and/or other aspects and utilities of the general inventive concept may also be achieved by providing an optical disk drive including a disk in which a land track and a groove track are switched to each other, a spindle motor to generate a first signal having a frequency which is proportional to a rotation speed of the disc, and a servo controller to measure information about a land/groove switch generation timing of the disc, using the first signal and a second signal having a predetermined frequency higher than the frequency of the first signal, in a normal playback mode, and to calculate a predicted land/groove switch generation position in a seek mode, using the information about the land/groove switch generation timing of the disc.

The servo-controller may include a counting unit to count a number of pulses of the first signal and a number of pulses of the second signal, and to measure information about a land/groove switch generation period, a storage unit to store the information about the land/groove switch generation period, and a land/groove switch position calculator to obtain a land/groove switch position in the seek mode, using the information about the land/groove switch generation period in the normal play mode stored in the storage unit.

The foregoing and/or other aspects and utilities of the general inventive concept may also be achieved by providing a computer-readable recording medium having embodied thereon a program to execute a method including measuring information about a land/groove switch generation timing of a disc, using a first signal having a frequency that varies in proportion to a rotation speed of the disk in a normal playback mode, and a second signal having a predetermined frequency higher than the frequency of the first signal, and calculating a predicted land/groove switch generation position in the seek mode, using the information about the land/groove switch generation timing.

The foregoing and/or other aspects and utilities of the general inventive concept may also be achieved by providing a switch detecting apparatus usable with an optical disk drive having a seek servo, the apparatus including a servo controller to predict a position at which a land/groove switching occurs in a seek mode of the optical disk drive, and to control the seek servo using the predicted land/groove switch position.

The foregoing and/or other aspects and utilities of the general inventive concept may also be achieved by providing an optical disk drive including a seek servo, and a servo controller to predict a position at which a land/groove switching occurs in a seek mode, and to control the seek servo using the predicted land/groove switch position.

The foregoing and/or other aspects and utilities of the general inventive concept may also be achieved by providing a method of operating an optical disk drive, the method including predicting a position at which a land/groove switching occurs in a seek mode of the optical disk drive, and controlling a seek servo of the optical disk drive using the predicted land/groove switch position.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE PREFERRED EMBODIMENTS

Figure 1:
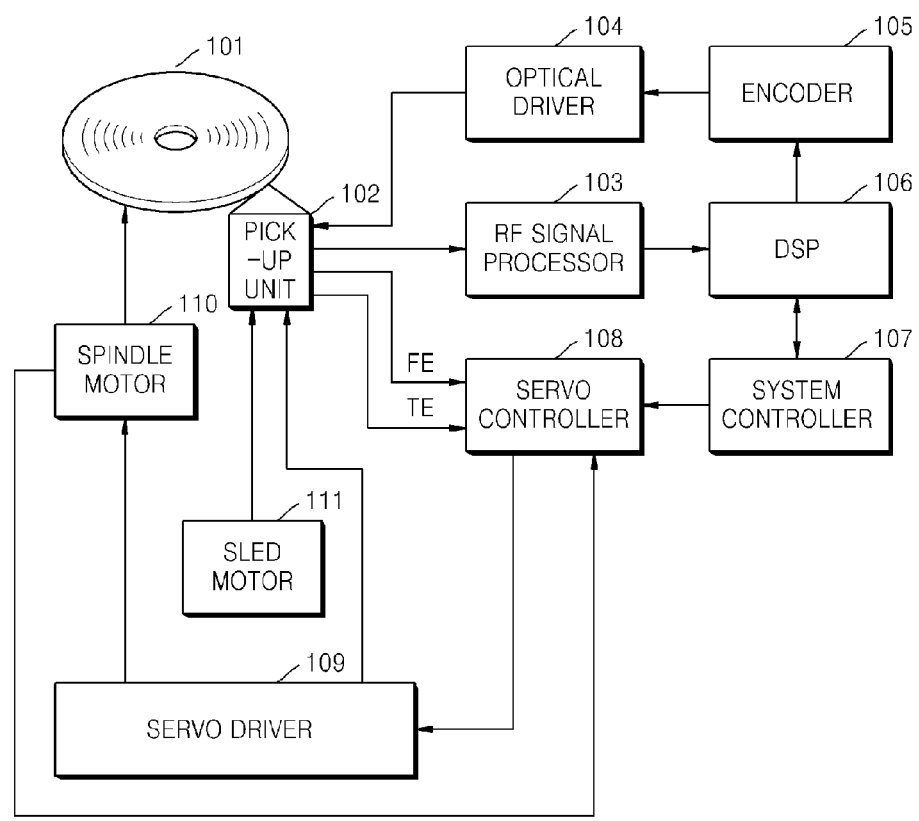
FIG. 1 is a block diagram illustrating an optical disk drive to which the present general inventive concept is applied.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an optical disk drive to which the present general inventive concept is applied.

Referring to FIG. 1, the optical disk driver includes a disk 101, a pick-up unit 102, a Radio-Frequency (RF) signal processor 103, an optical driver 104, an encoder 105, a digital signal processor (DSP) 106, a system controller 107, a servo controller 108, a servo driver 109 a spindle motor 110, and a sled motor 111.

An operation of the respective components will be described below.

The disk 101 has a spiral track structure in which a land track and a groove track are switched to each other whenever the disk 101 rotates one cycle. Each track is composed of a plurality of sectors, and each sector includes a header region which is located at a head of the sector, and a user information region in which user's desired information will be recorded. A code indicating a physical location of a corresponding track is recorded in a pre-pit portion of the header region. In a normal play mode, a land/groove switch position is detected using a signal which is reproduced from the pre-pit portion of the header region. In some cases, a land/groove switch position can be detected by reading information about the land/groove switch position after recoding the information about the land/groove switch position in the header region.

The pick-up unit 102 includes a laser diode, a plurality of photo-diodes, a variety of lenses, and an actuator to move the lenses in a horizontal/vertical direction, as not illustrated in FIG. 1. The pick-up unit 102 projects a laser beam having a recoding power on the disk 101 to thus record data in the disk 101, or detects signals recorded in the disk 101 from a beam reflected from the disk 101. Specifically, the plurality of photodiodes combine output signals of the photodiodes with each other, generates a tracking error signal (TE) and a focus error signal (FE) for servo-control, and also generates a signal for signal processing.

The RF signal processor 103 performs filtering and shaping on the signal for signal-processing which is detected by the pick-up unit 102, converts the result of the filtering and shaping into a binary signal, and then outputs the result of the binarization to the digital signal processor 106.

The optical driver 104 outputs a laser driving signal corresponding to a received signal in a recording mode, and outputs a laser driving signal to generate a predetermined level of a reproducing power in a playback mode.

The encoder 105 converts data which has been converted into a recording format by the digital signal processor 106, into a bit stream, and outputs the bit stream to the optical driver 104.

The digital signal processor 106 receives the binary signal from the RF signal processor 103, and performs signal-processing to restore the binary signal into original data thereof in synchronization to an internal clock signal, in the playback mode. Also, the digital signal processor 106 performs signal-processing to add an error correction code (ECC) to input digital data and converting the resultant digital data into a recording format, in the recording mode.

The servo controller 108 generates a driving control signal to drive the actuator of the pick-up unit 102 to control the pick-up unit 102 in a horizontal direction or in a vertical direction, using the tracking error signal TE and the focus error signal FE. The servo controller 108 generates a sled motor driving control signal to move the pick-up unit 102 to a target track, in the seek mode. Also, the servo controller 108 generates a spindle motor driving control signal to rotate the disk 101 at a speed corresponding to a set spin rate, using a Frequency Generation (FG) signal which is generated by the spindle motor 110.

The FG signal is a pulse signal obtained by zero-crossing a back electromotive force signal which is generated by the spindle motor 110, and a predetermined number of FG signal pulses that are generated whenever the disk 101 rotates one cycle. Accordingly, the frequency of the FG signal changes in proportion to the rotation speed of the disk 101.

The servo driver 109 generates a driving current to drive the spindle motor 110 and the sled motor 111 according to the driving control signal which is generated by the servo controller 108, and generates a driving current to drive the actuator of the pick-up unit 102 to perform focusing and tracking-control of the optical lens of the pick-up unit 102.

The system controller 107 controls the optical disk drive to be suitable to a mode which is set according to a user's selection. In particular, if the disk 101 is loaded on the optical disk drive, a disk determination mode is executed, and parameter values are set to determine a laser power, coefficients of a variety of filters, etc., according to the specification of the disk 101.

If the disk 101 is a DVD-RAM, the phase of a tracking error signal in land regions of tracks is opposite to the phase of a tracking error signal in groove regions of tracks. The phase of the tracking error signal has to be inverted at a land/groove switch position. In the normal playback mode, since a land/groove switch position can be accurately detected using header information recorded in the disk 101, easily inverting the phase of a tracking error signal using the land/groove switch position is possible.

However, in a seek mode, since header information cannot be accurately read, detecting a land/groove switch position using header information is difficult.

Accordingly, in an embodiment of the present general inventive concept, a method of detecting a position at which land/groove switching is predicted in a seek mode using a FG signal which is generated by the spindle motor 110, is illustrated.

Figure 2:
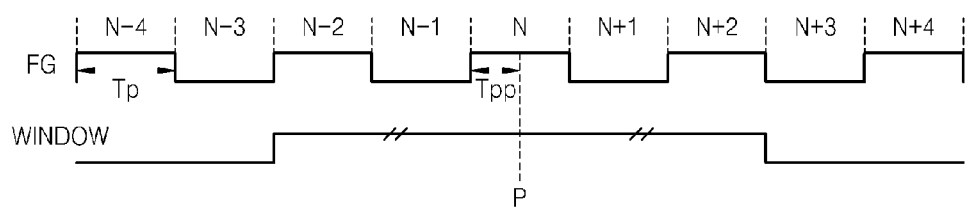
FIG. 2 illustrates timing diagrams of a Frequency Generation (FG) signal and a window signal which are used to detect a land/groove switch position, according to an embodiment of the present general inventive concept.

The FG signal is generated in a form of a predetermined number of pulses whenever the disk 101 rotates one cycle, as illustrated in FIG. 2. A DVD-RAM-type disk 101 has a spiral track structure in which a land track and a groove track are switched to each other whenever the disk 101 rotates one cycle.

Accordingly, a number of FG signal pulses that are generated during a land/groove switch period is constant regardless of an execution mode and the rotation speed of the disk 101. Also, a ratio of an interval from a land/groove switch position to an edge of a FG signal pulse which is generated nearest to the land/groove switch position, with respect to the FG signal pulse period, is constant.

Using this concept, in the normal playback mode, information about a land/groove switch timing of the disk 101 is measured using the FG signal, and thus, a land/groove switch position can be detected in the seek mode using the information about the land/groove switch timing.

Accordingly, the servo controller 108 includes a hardware and a software to execute a series of operations to measure the information about the land/groove switch timing of the disk 101 using the FG signal, in the normal playback mode, and detecting a land/groove switch position in the seek mode using the information about the land/groove switch timing.

Figure 3:
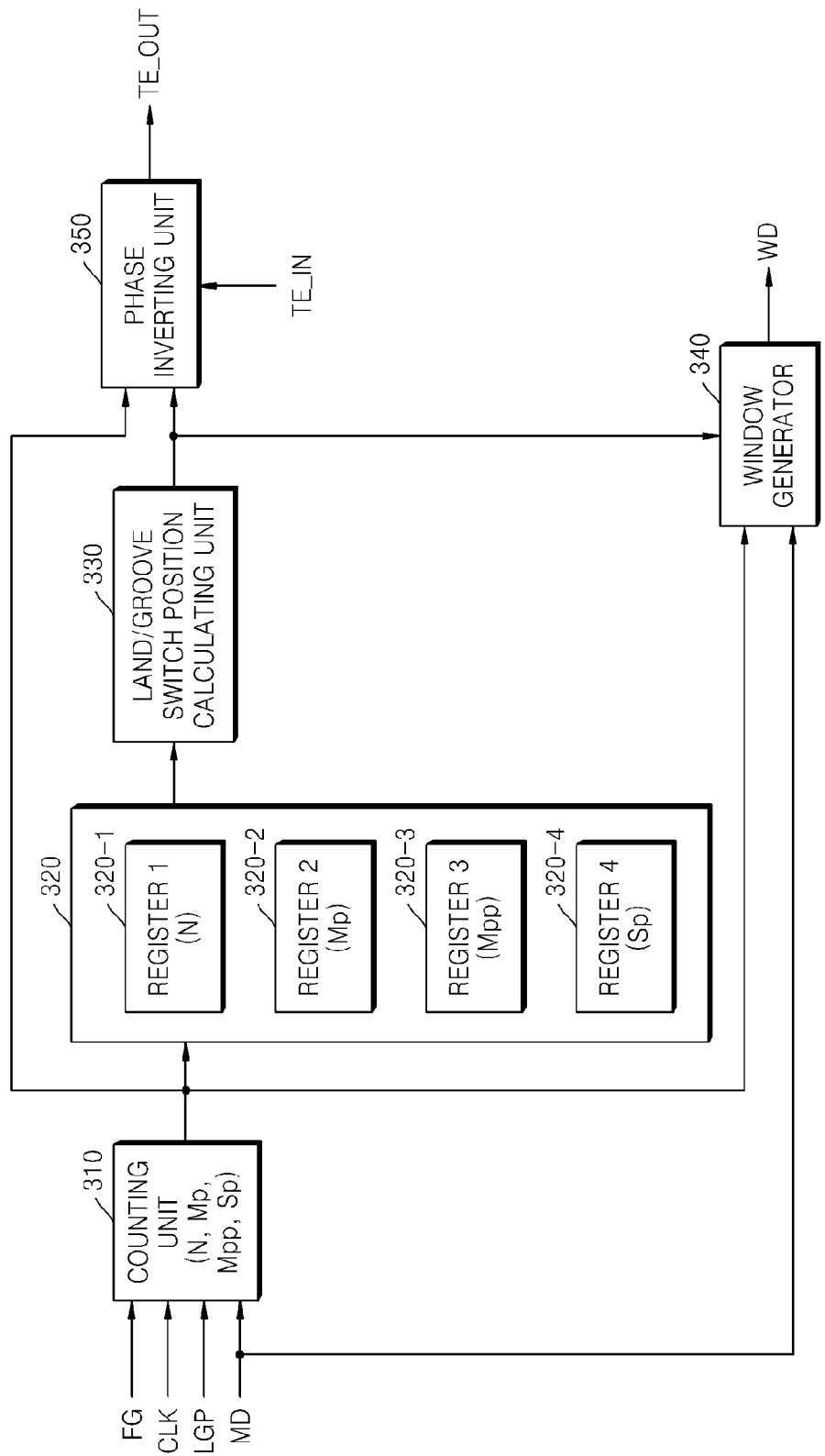
FIG. 3 is a block diagram illustrating an apparatus of detecting a land/groove switch position in a seek mode, according to an embodiment of the present general inventive concept.

FIG. 3 is a detailed block diagram illustrating the servo controller 108 illustrated in FIG. 1.

Referring to FIG. 3, the servo controller 108 includes a counting unit 310, a storage unit 320, a land/groove switch position detecting unit 330, a window generator 340, and a phase inverting unit 350.

The counting unit 310 generates information N, Mp, Mpp, and Sp about a land/groove switch period by counting a number of FG signal pulses and a number of clock signal (CLK) pulses. Here, the clock signal CLK has a predetermined frequency higher than that of the FG signal.

The counting unit 310 can determine a current mode according to a mode control signal MD. That is, the counting unit 310 can determine whether a current mode is the normal playback mode or the seek mode, according to the mode control signal MD. The mode control signal MD is generated by the system controller 107 (see FIG. 1), in response to a command which is selected by a user.

Also, the counting unit 310 resets a counter (not illustrated) to count the number of FG signal pulses, in response to a control signal LGP indicating detection of a land/groove switch position. The control signal LGP detects and generates a land/groove switch position using header information which is recorded in the disk 101, in the normal playback mode, and generates a land/groove switch position at a predicted land/groove switch position which is calculated by the land/groove switch position detecting unit 330, in the seek mode.

If a determination is made according to the mode control signal MD that the current mode is the normal playback mode, the counting unit 310 counts the number (N) of FG signal pulses that are generated during a land/groove switch period, the number Mp of clock signal (CLK) pulses that are generated during a FG signal pulse period Tp, and the number Mpp of clock signal pulses that are generated during a time interval Tpp from the generation time of an edge of a final FG signal pulse which is generated in the land/groove switch period, to a land/groove switch time.

Additionally, in the normal playback mode, since a land/groove switch position (LGP) can be accurately detected using header information which is recorded in the disk 101, the values N, Mp, and Mpp among the information about the land/groove switch period can be accurately measured.

In the normal playback mode, the number Mp of the clock signal pulses that are generated during the FG signal pulse period Tp can be measured on a basis of an arbitrary FG signal pulse period which is included in the land/groove switch period, and in the above embodiment as illustrated in FIG. 2, the number Mp of the clocks signal pulses is measured on a basis of a (N−4)-th FG signal pulse period.

The counting unit 310 can count the corresponding FG signal pulse whenever a rising edge is generated, or whenever a falling edge is generated. In some cases, the counting unit 310 can count the corresponding FG signal pulse whenever a rising edge or a falling edge is generated.

In FIG. 2, a case where FG signal pulses are counted at rising and falling edges is illustrated.

In the normal playback mode, the values N, Mp, and Mpp that are measured by the counting unit 310 are respectively stored in first, second, and third registers 320-1, 320-2, and 320-3 of the storage unit 320.

Then, if the current mode transits from the normal playback mode to the seek mode, the counting unit 310 continues to count the FG signal pulses, and simultaneously counts the number Sp of clock signal pulses that are generated during the FG signal pulse period.

In the seek mode, the number Sp of the clock signal pulses that are generated during the FG signal pulse period can be measured on a basis of an arbitrary FG signal pulse period which is included in the land/groove switch period such as the number Sp of the clock signal pulses is measured at the generation position of a FG signal pulse in which a Mp value is measured in the normal playback mode.

Accordingly, in the normal playback mode, if a Mp value is measured at a (N−4)-th FG signal pulse, the number Sp of the clock signal pulses is also measured at the (N−4)-th FG signal pulse.

In the seek mode, the number Sp of the clock signal pulses, which is measured by the counting unit 310, is stored in a fourth register 320-4 of the storage unit 320.

Thus, in the seek mode, the land/groove switch position detecting unit 330 calculates a predicted land/groove switch position, as follows.

The number of FG signal pulses that are generated during the land/groove switch period in the seek mode, is equal to the number N of FG signal pulses counted during a land/groove switch period in the normal playback mode.

However, if the rotation speed of the spindle motor 110 changes, the number of clock signal pulses that are generated during the FG signal pulse period Tp also varies.

Accordingly, the number Spp of clock signal pulses that are generated during a time interval Tpp from the generation time of an edge of a final FG signal pulse among FG signal pulses generated during the land/groove switch period, to a land/groove switch time, is calculated by Equation 1.

$$Spp = (Sp*Mpp)/Mp \quad (1)$$

Accordingly, the predicted land/groove switch generation position P in the seek mode can be represented by Equation 2.

$$P = T\_N + T\_Spp, \quad (2)$$

where T_N represents a length of a period in which N FG signal pulses are generated, and T_Spp represent a length of a period in which Spp clock pulses are generated.

Accordingly, the land/groove switch position detecting unit 330 obtains information N and Spp about the predicted land/groove switch generation position P in the seek mode, and outputs the information N and Spp to the window generator 340 and the phase inverting unit 350. Additionally, when a count value of the counter (not illustrated) of counting FG signal pulses in the counting unit 310 reaches N in the seek mode, counting of clock signal (CLK) pulses is started, and a position of when a count value of the clock signal (CLK) pulses reaches Spp becomes the predicted land/groove switch generation position P in the seek mode. Also, at the predicted land/groove switch generation position P in the seek mode, the servo controller 108 generates a control signal LGP indicating that a land/groove switch position is found, and resets the counter of counting the FG signal pulses.

Then, the window generator 340 generates a window signal WD having a predetermined width to control a seek speed, on a basis of the predicted land/groove switch generation position P. Here, the predetermined width of the window signal WD can be set to vary in inverse-proportion to the frequency of the FG signal. Also, the window signal WD may be generated in such a manner that the window signal has a bilateral symmetrical shape with respect to the predicted land/groove switch generation position.

If the predetermined width of the window signal WD is set, FG signal pulses and clock signal pulses are counted, so that generation and termination times of the window signal WD can be detected.

If the window signal WD is generated by the window generator 340, the servo controller 108 controls a seek speed. That is, while the window signal WD is generated, the servo controller 108 holds a seek speed control signal which has been generated just before the window signal WD is generated, or performs servo-control so that no seek speed control signal is generated. For example, the seek speed control signal may be a tracking kick control signal to move an optical lens in the pick-up device 102.

Also, the phase inverting unit 350 inverts the phase of a tracking error signal TE_IN at the predicted land/groove switch generation position P in the seek mode, and outputs a tracking error signal TE_OUT to the servo controller 108. Then, the servo controller 108 performs servo-control using the tracking error signal TE_OUT.

Figure 4:
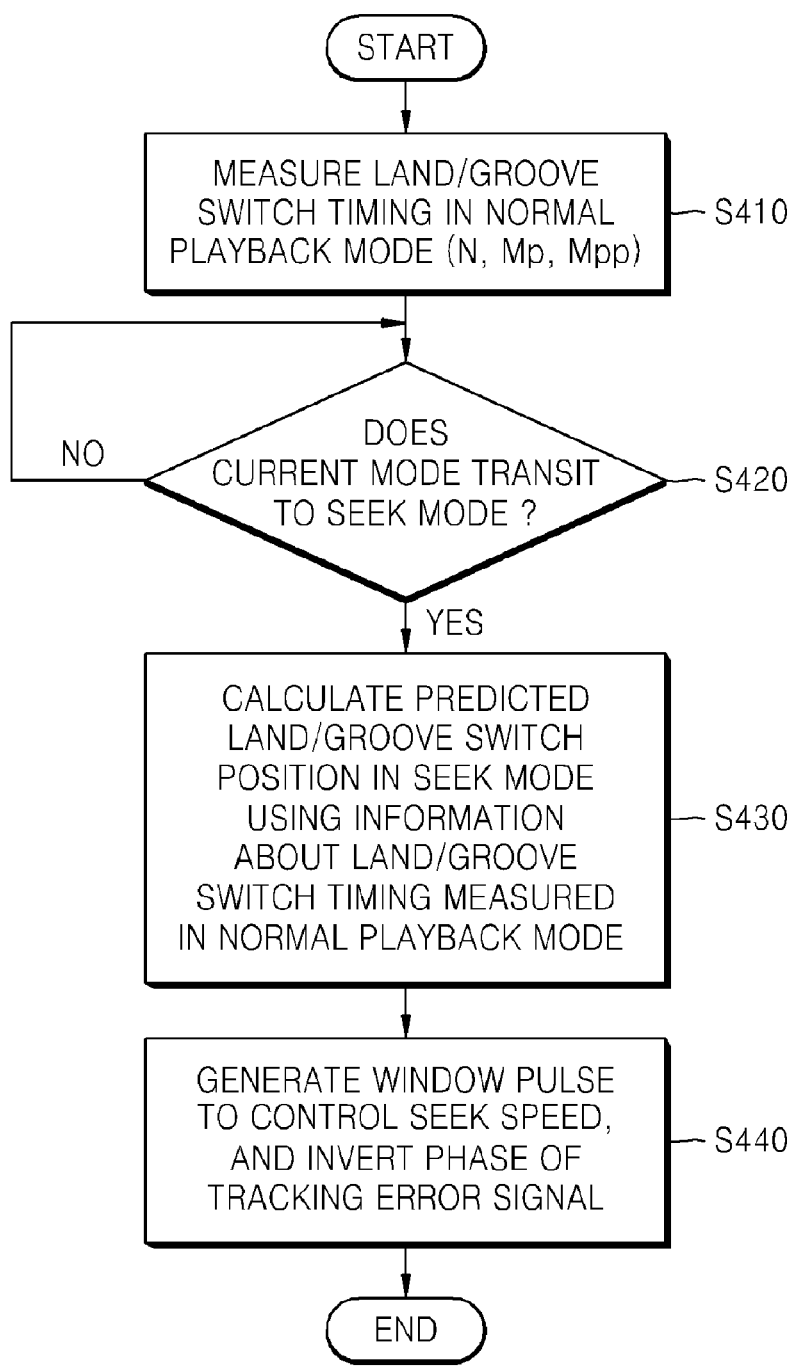
FIG. 4 is a flowchart illustrating a method of detecting a land/groove switch position in a seek mode, according to an embodiment of the present general inventive concept.

Next, a method of detecting a land/groove switch position in the seek mode, according to an embodiment of the present general inventive concept, will be described with reference to FIG. 4.

If a DVD-RAM type disk is loaded on an optical disk drive, information N, Mp, and Mpp about a land/groove switch generation timing of the disk is measured, using a first signal having a frequency that changes in proportion to the rotation speed of the disk and a second signal having a predetermined frequency (operation S410).

Here, the first signal may be a signal of generating a predetermined number of pulses whenever the disk rotates one cycle, and the second signal may be a clock signal having a predetermined frequency higher than the frequency of the first signal.

In an embodiment of the present general inventive concept, the first signal is a FG pulse signal obtained by zero-crossing a back electromotive force signal which is generated by the spindle motor 110 (see FIG. 1) to rotate the disc.

In detail, in the normal playback mode, the number N of FG signal pulses that are generated from a current land/groove switch time to the previous land/groove switch time, the number Mp of clock signal pulses that are generated during one FG signal pulse period, and the number Mpp of clock signal pulses that are generated during a time interval from the generation time of a FG signal pulse which is generated nearest to the current land/groove switch generation time, to the current land/groove switch generating time, are measured.

The number N of FG signal pulses is measured by a counter (not illustrated) to count the number of FG signal pulses, wherein the counter is reset by a control signal LGP indicating that a land/groove switch position is found. The control signal LGP detects and generates a land/groove switch position using header information recorded on a disc, in the normal playback mode, and generates a land/groove switch position at a predicted land/groove switch generation position in the seek mode.

Then, a determination is made whether the optical disk drive transits from the normal playback mode to the seek mode (operation S420).

If a determination is made in operation S420 that the optical disk drive transits from the normal playback mode to the seek mode, a predicted land/groove switch generation position in the seek mode is calculated using information about a land/groove switch timing which has been measured in the normal playback mode (operation S430).

The predicted land/groove switch generation position in the seek mode is obtained by adding a length corresponding to a ratio of an interval length from a land/groove switch generation position to the edge position of a FG signal pulse which is generated nearest to the land/groove switch generation position with respect to the length of a FG signal pulse period measured in the normal playback mode to the length of FG signal pulses that are included during a land/groove switch period in the normal playback mode from a previous land/groove switch position.

In detail, the predicted land/groove switch generation position in the seek mode can be calculated using the above Equations 1 and 2.

Then, a window signal to control a seek speed according to the predicted land/groove switch generation position, is generated, and also, the phase of a tracking error signal is inverted at the predicted land/groove switch generation position (operation S440). Here, the width of the window signal can vary in inverse-proportion to the frequency of the FG signal. Also, the window signal may be generated in such a manner that the window signal has a bilateral symmetrical shape with respect to the predicted land/groove switch generation position.

In this way, accurately predicting a land/groove switch generation position in the seek mode, and invert the phase of a tracking error signal and control a seek speed using the predicted land/groove switch generating position, thereby executing stable seek servo-control.

The present general inventive concept can be implemented as a method, an apparatus, and a system. The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to various embodiments of the present general inventive concept, by accurately calculating a predicted land/groove switch generation position while an optical disk drive executes a seek mode, and controlling a seek speed near the predicted land/groove switch generation position, executing stable seek servo-control is possible. Also, by inverting the phase of a tracking error signal at the predicted land/groove switch generation position in the seek mode, executing stable seek servo-control is possible. Particularly, by accurately predicting a land/groove switch position and inverting the phase of a tracking error signal using the land/groove switching position even when the land/groove switch position is found at a tracking pull-in time, avoiding a track deviation phenomenon which is generated when the phase of the tracking error signal becomes opposite to a desired phase to be controlled is possible.

While the present general inventive concept has been particularly illustrated and described with reference to exemplary embodiments thereof, it will be understood by those of ordinary skill in the art that various changes in form and details may be made therein without departing from the spirit and scope of the present general inventive concept as defined by the following claims.

What is claimed is:

1. A method to detect a land/groove switch position in a seek mode, the method comprising:
    measuring information about a land/groove switch generation timing of a disk, using a first signal having a frequency that varies in proportion to a rotation speed of the disk in a normal playback mode, and a second signal having a predetermined frequency higher than the frequency of the first signal; and
    calculating a predicted land/groove switch generation position in the seek mode, using the information about the land/groove switch generation timing.

2. The method of claim 1, wherein the first signal generates a predetermined number of pulses whenever the disk rotates one cycle.

3. The method of claim 1, wherein the first signal is a pulse signal obtained by zero-crossing a back electromotive force signal which is generated by a spindle motor to rotate the disk.

4. The method of claim 1, wherein the information about the land/groove switch generation timing comprises:
information regarding a number of first signal pulses that are generated from a current land/groove switch time to a previous land/groove switch time, pulse width information of the first signal, and information regarding a time interval from a generation time of a first signal pulse which is generated nearest to the current land/groove switch time to the current land/groove switch time.

5. The method of claim 4, wherein the pulse width information of the first signal is measured using the second signal.

6. The method of claim 4, wherein the information regarding the time interval from the generation time of the first signal pulse which is generated nearest to the current land/groove switch time to the current land/groove switch time, is measured using the second signal.

7. The method of claim 1, wherein the predicted land/groove switch generation position in the seek mode is obtained by adding a length corresponding to a ratio of an interval length from a land/groove switch generation position to an edge position of a first signal pulse which is generated nearest to the land/groove switch generation position with respect to a length of a first signal pulse period measured in the normal playback mode to a length of first signal pulses that are included during a land/groove switch period in the normal playback mode from a previous land/groove switch position.

8. The method of claim 1, wherein the predicted land/groove switch generation position P in the seek mode is calculated using the following equations:

$$P = T\_N + T\_{Spp}$$

$$T\_{Spp} = T\_(Sp*Mpp)/Mp,$$

where T_N represents a length of a period in which first signal pulses are generated by the number N of first signal pulses that are included in a land/groove switch period measured in the normal play mode, T_(Sp*Mpp)/Mp represents a length of a period in which second signal pulses are generated by (Sp*Mpp)/Mp, Mpp represents a number of second signal pulses from an edge generation time of a final first signal pulse among the first signal pulses that are included in the land/groove switch period measured in the normal playback mode, to a land/groove switch time, Sp represents number of second signal pulses measured during a pulse width period of the first signal in the seek mode, and Mp represents a number of second signal pulses measured during a first signal pulse period in the normal playback mode.

9. The method of claim 1, further comprising:
inverting a phase of a tracking error signal at the predicted land/groove switch generation position in the seek mode.

10. The method of claim 1, further comprising:
generating a window signal having a predetermined width to control a seek speed, on a basis of the predicted land/groove switch generation position.

11. The method of claim 10, wherein the predetermined width of the window signal varies according to a frequency of the first signal.

12. The method of claim 11, wherein the predetermined width of the window signal varies in inverse-proportion to the frequency of the first signal.

13. The method of claim 12, wherein the window signal is generated in such a manner that the window signal has a bilateral symmetrical shape with respect to the predicted land/groove switch generation position.

14. The method of claim 10, wherein in a period in which the window signal is generated, a seek speed control signal generated before the window signal is generated is hold.

15. The method of claim 14, wherein the seek speed control signal is a tracking kick control signal to move an optical lens in a pick-up unit.

16. The method of claim 10, wherein, in a period in which the window signal is generated, no seek speed control signal is generated.

17. An apparatus to detect a land/groove switch position in a seek mode, the apparatus comprising:
a counting unit to count a number of pulses of a first signal and a number of pulses of a second signal, and to generate information about a land/groove switch generation period according to the count result;
a storage unit to store the information about the land/groove switch generation period in a normal playback mode; and
a land/groove switch position calculator to obtain a land/groove switch position in a seek mode, using information about the land/groove switch generation period in the normal play mode stored in the storage unit.

18. The apparatus of claim 17, wherein the frequency of the first signal varies in proportion to a rotation speed of a disk, and the second signal has a predetermined frequency higher than a frequency of the first signal.

19. The apparatus of claim 17, wherein the first signal generates a predetermined number of pulses whenever the disk rotates one cycle.

20. The apparatus of claim 17, wherein the information about the land/groove switch generation period comprises:
a number N of first signal pulses that are generated during a land/groove switch period in the normal playback mode, a number Mp of second signal pulses that are generated during a first signal pulse, a number Mpp of second signal pulses that are generated during a time interval Tpp from a generation time of an edge of a final first signal pulse among the first signal pulses generated during the land/groove switch period, to a land/groove switch time, and a number Sp of second signal pulses that are generated during a first signal pulse period in the seek mode.

21. The apparatus of claim 17, wherein the land/groove switch position calculator determines the land/groove switch position in the seek mode, by adding a length corresponding to a ratio of an interval length from a land/groove switch generation position to an edge position of a first signal pulse which is generated nearest to the land/groove switch generation position with respect to the length of a first signal pulse period measured in the normal play mode to the length of first signal pulses that are included during a land/groove switch period in the normal playback mode from previous land/groove switch position.

22. An optical disk drive, comprising:
a disk in which a land track and a groove track are switched to each other;
a spindle motor to generate a first signal having a frequency which is proportional to a rotation speed of the disk; and
a servo controller to measure information about a land/groove switch generation timing of the disk, using the first signal and a second signal having a predetermined frequency higher than the frequency of the first signal, in a normal playback mode, and to calculate a predicted land/groove switch generation position in a seek mode, using the information about the land/groove switch generation timing of the disk.

23. The optical disk drive of claim 22, wherein the servo-controller comprises:
   a counting unit to count a number of pulses of the first signal and a number of pulses of the second signal, and to measure information about a land/groove switch generation period;
   a storage unit to store the information about the land/groove switch generation period; and
   a land/groove switch position calculator to obtain a land/groove switch position in the seek mode, using the information about the land/groove switch generation period in the normal play mode stored in the storage unit.

24. The optical disk driver of claim 23, wherein the land/groove switch position calculator determines the predicted land/groove switch generation position in the seek mode, by adding a length corresponding to a ratio of an interval length from a land/groove switch generation position to an edge position of a first signal pulse which is generated nearest to the land/groove switch generation position with respect to a length of a first signal pulse period measured in the normal playback mode to a length of first signal pulses that are included during a land/groove switch period in the normal playback mode a previous land/groove switch position.

25. A computer-readable recording medium having embodied thereon a program to execute a method, the method comprising:
   measuring information about a land/groove switch generation timing of a disk, using a first signal having a frequency that varies in proportion to a rotation speed of the disk in a normal playback mode, and a second signal having a predetermined frequency higher than the frequency of the first signal; and
   calculating a predicted land/groove switch generation position in the seek mode, using the information about the land/groove switch generation timing.

26. A switch detecting apparatus usable with an optical disk drive having a seek servo, the apparatus comprising:
   a servo controller to predict a position at which a land/groove switching occurs in a seek mode of the optical disk drive using a measured land/groove generation timing information of an optical disk and to control the seek servo using the predicted land/groove switch position,
   wherein the measured land/groove generation timing information includes a number of frequency generation signal pulses generated per rotation of the optical disk.

27. An optical disk drive, comprising:
   a seek servo; and
   a servo controller to predict a position at which a land/groove switching occurs in a seek mode using a measured land/groove generation timing information of an optical disk and to control the seek servo using the predicted land/groove switch position,
   wherein the measured land/groove generation timing information includes a number of frequency generation signal pulses generated per rotation of the optical disk.

28. A method of operating an optical disk drive, the method comprising:
   predicting a position at which a land/groove switching occurs in a seek mode of the optical disk drive using a measured land/groove generation timing information of an optical disk; and
   controlling a seek servo of the optical disk drive using the predicted land/groove switch position,
   wherein the measured land/groove generation timing information includes a number of frequency generation signal pulses generated per rotation of the optical disk.

29. A method to detect a land/groove switch position of a disk, the method comprising:
   receiving land/groove switch timing information of the disk while in a first mode; and
   calculating a land/groove switch position of the disk while in a second mode based on the received land/groove switch timing information,
   wherein the first mode represents a playback mode and the second mode represents a seek mode, and
   wherein the land/groove switch timing information includes a number of frequency generation signal pulses generated per rotation of the disk.

30. The method of claim 29, wherein a frequency of the frequency generation signal corresponds to a rotation speed of the disk.

* * * * *